Oct. 31, 1967 C. ROUNTREE 3,349,643
ADJUSTABLE MECHANICAL MOVEMENT
Filed Nov. 5, 1965 5 Sheets-Sheet 1

INVENTOR.
CALVIN ROUNTREE
BY
Brumbaugh, Free, Graves & Donohue
his ATTORNEYS

Oct. 31, 1967  C. ROUNTREE  3,349,643
ADJUSTABLE MECHANICAL MOVEMENT
Filed Nov. 5, 1965  5 Sheets-Sheet 2

INVENTOR.
CALVIN ROUNTREE
BY
Brumbaugh, Free, Graves & Donohue
his ATTORNEYS

Oct. 31, 1967  C. ROUNTREE  3,349,643
ADJUSTABLE MECHANICAL MOVEMENT
Filed Nov. 5, 1965  5 Sheets-Sheet 3

INVENTOR.
CALVIN ROUNTREE
BY Brumbaugh, Free,
Graves & Donohue
his ATTORNEYS

Oct. 31, 1967  C. ROUNTREE  3,349,643
ADJUSTABLE MECHANICAL MOVEMENT
Filed Nov. 5, 1965  5 Sheets-Sheet 5

INVENTOR.
CALVIN ROUNTREE
BY
Brumbaugh, Free, Graves & Donohue
his ATTORNEYS

United States Patent Office 3,349,643
Patented Oct. 31, 1967

3,349,643
ADJUSTABLE MECHANICAL MOVEMENT
Calvin Rountree, 6 Spalding Court,
Saugerties, N.Y. 12477
Filed Nov. 5, 1965, Ser. No. 506,507
13 Claims. (Cl. 74—838)

The present invention relates to mechanisms for producing a desired mechanical movement and, more particulraly, to such apparatus for providing reciprocating motion whose amplitude, or length of stroke, may be varied over a wide range of values without interrupting the operating cycle of the mechanism.

An almost infinite variety of machines depend at some point in their organization upon a reciprocating motion of a member, and many diverse mechanical linkages to provide such motion have been devised. In the ordinary case, a structural arrangement to provide the desired motion in a particular application may be simply and reliably implemented, but the problem becomes considerably more complex when a requirement exists for a variable length stroke or amplitude of reciprocation. The difficulties are further compounded when it is desired also that a change of stroke amplitude be accomplished without shutting down the machine or otherwise interrupting the sequence of operations then proceeding.

In many automated manufacturing processes, as well as operations such as sorting, feeding inserting, etc., elements of a variety of sizes may have to be manipulated. Ordinarily, a change in size of the elements being worked on necessitates shutting down the machine to make a mechanical change or a substitution of different parts to accommodate the new size. As a result, machine down time becomes a factor to be taken into account, especially in high volume, mass production operations. To minimize this problem, manufacturing is generally done in batches, or runs, to produce a large number of units of a given size. However, this technique is unwieldy where the market demands for the product fluctuate widely and randomly over the sizes of the range offered by the manufacturer. Shortages in some sizes of the finished products often occur while surpluses of other sizes are on hand, and the customer must await the next scheduled run of the size he requires.

It would therefore be desirable that the production machinery be readily adjustable over a range such that products of any size within the range may be produced at will, even in small quantities, without requiring the stoppage of the machinery, so that the demands for different sizes may be readily met. Naturally, such machinery also must be sufficiently simple in construction and reliable in operation so that its initial and operating costs render its use feasible. It is the primary object of the present invention to provide a basic mechanical movement which generates a reciprocating output motion capable of use in a wide variety of machinery and which fulfills the above requirements.

Another object of the invention is to provide a mechanical movement for producing reciprocating output motion from any available source of rotative power, such as an electric motor.

Still another object of the invention is to provide a mechanical movement for providing a reciprocating motion whose stroke may be varied over a wide range of amplitudes but whose period remains constant.

A still further object of the invention is to provide a mechanical movement providing a variable stroke reciprocating output that is capable of being controlled by the output of a computer or the like.

Briefly, the basic elements of the invention include an output arm which is pivoted at one point on a support frame and which includes means spaced from its pivot point for coupling to a device to be reciprocated. A connecting link has one end pivoted to the output member at a point thereon between its pivot point and its output point. To establish the length of stroke, a radius arm is provided which is pivoted at one end to the other end of the connecting link, the other end of the radius arm being supported at any one of a number of selectable positions. Drive means are connected to the common pivot point of the connecting link and the radius arm for oscillating the common point along a portion of a circle whose center is the other end of the radius arm. As these members are oscillated, the output member is moved back and forth about its pivot, inducing a reciprocating motion of its output connection. The position of the movable end of the radius arm with respect to the connection of the connective link to the output member determines the length of stroke, i.e., the farther apart the two points are, the greater the stroke.

The position of the movable end of the radius arm is determined by means of a control arm which is coupled to the radius arm and which has a stepped cam surface. A number of interposer bars, equal to the number of steps on the cam surface, are controlled by relay means to adjust the position of the control arm and thus the free end of the radius arm. This adjustment can be effected rapidly, such as during the dwell time at the end of a reciprocating stroke, so that the very next stroke of the arm will be of the newly selected amplitude. Thus, not even one cycle of operation need be missed when changing the stroke amplitude.

The foregoing and other objects, features and advantages of the invention will become more apparent from the following detailed description thereof, when taken in conjunction with the accompany drawings, in which.

Turning first to FIGURES 1 to 4, the structure of the invention is mounted on any convenient type of support frame 110 which may, for example, include a base plate 112 on opposite sides of which are bolted respective upright side plates 114. It will be realized, of course, that the support frame 110 may take whatever configuration is required by the apparatus in which it is used, so long as it provides the required pivot points and journals to be described.

The mechanical movement itself comprises an elongated output member 116 pivoted at one end thereof about a fixed shaft 118 extending between and supported by the side plates 114 of the support frame. A sleeve 120 is welded or otherwise fixed to the end of the output member 116 and carries a cylindrical bushing 122 such as of bronze. The bushing makes a snug but freely rotating fit about the shaft 118 and its extended length maintains the output member 116 accurately aligned during operation.

Figure 1:
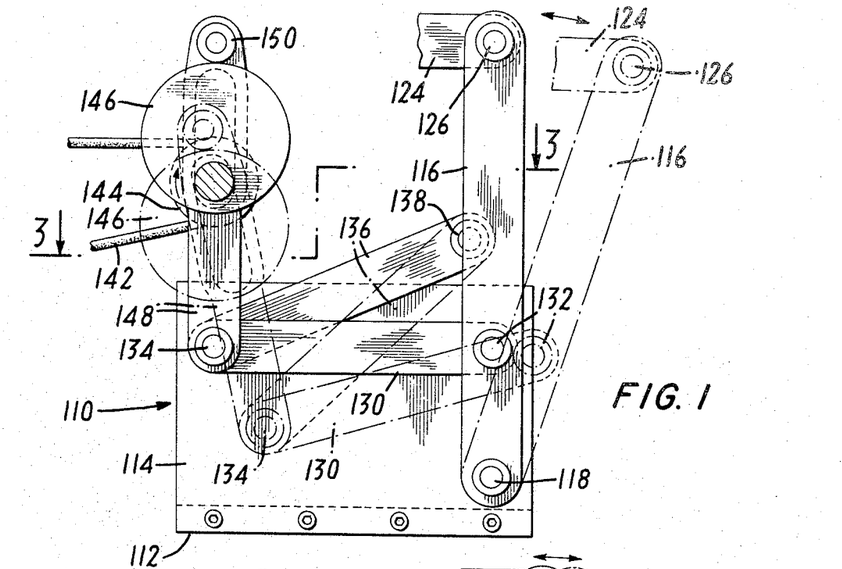
FIGURE 1 is a side elevation of the mechanical movement of the invention, with some parts removed to simplify the drawing, illustrating the relative positions of several of the members thereof to produce a given length of stroke.
Figure 2:
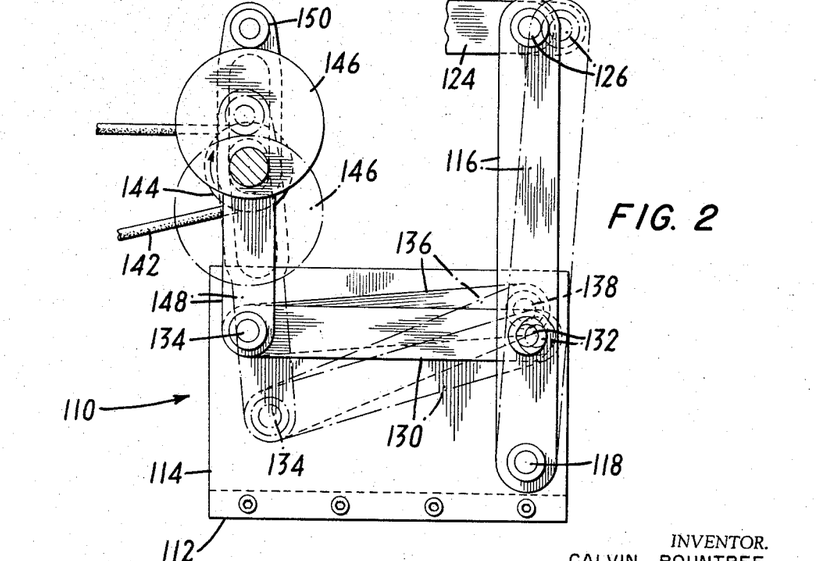
FIGURE 2 is another side elevation of the invention illustrating the positions of the several members when providing a stroke smaller than that of FIGURE 1.

The upper end of the output member 116 is provided with a suitable connecting means for coupling to an element, such as 124, to be reciprocated. In the arrangement shown, a pivotal connection 126 is provided.

For ease of illustration, the details of the various pivotal connections have been omitted, but it will be understood that each includes a shaft element, a bearing element, and suitable retaining means (such as snap rings) to maintain the various components in assembly.

A connecting link 130 is pivotally connected at one end 132 to a point on the output member 116 intermediate its ends. The other end of the link 130 is pivotally connected at 134 to one end of the radius arm 136. The other end 138 of the radius arm 136 is movable, by means to be described hereinafter, between any of a plurality of selectable positions, such as the two illustrated in FIGURES 1 and 2, respectively.

The input power for the movement thus far described is provided by any suitable motive means coupled to the commonly pivoted ends 134 of the connecting link 130 and the radius arm 136. Conveniently, the power may be coupled by a belt 142 which drives a pulley 144 fixed on a common shaft with a cam 146. A yoke member 148 also rides on the common shaft and includes at its upper end a cam follower 150. As the cam 146 rotates, the yoke 148 moves generally up and down along a path determined by the shaft and the cam surface. The lower end of the yoke 148, at the common connection of the connecting link and the radius arm, actually follows an arcuate path along a portion of a circle whose center is at the end 138 of the radius arm. As the cam 146 rotates, the common end 134 of the connecting link and the radius arm oscillates back and forth along the arcuate path at a frequency determined by the speed of revolution of the cam.

As the common connection 134 of the connecting link and the radius arm oscillates along its arcuate path, the other end of the connecting link is constrained to move correspondingly along a generally lateral path. Actually, this path is along a circle whose center is the point of pivotal connection of the output member 116 to the frame 110. It will be seen therefore, that this motion will oscillate the output member 116 about its pivot point 118 on the support frame such that an element 124 coupled to its other end 126 will be reciprocated.

To illustrate the adjustability feature of the mechanism, the pivot 138 of the radius arm 136 is shown at two different positions in FIGURES 1 and 2, respectively. In FIGURE 1, the pivot 138 is fixed at a relatively high position with respect to the base plate 112 of the support frame. In this position, the drive motion is transmitted to the output member 116 through the connecting link 130 such that the stroke at the output end of the output member is of relatively high amplitude. Lowering the position of the pivot point 138, as in FIGURE 2, results in a decrease of the amplitude of the reciprocating stroke.

It will be seen, however, that although the stroke with the radius arm fixed as in FIGURE 2 is substantially smaller than that of FIGURE 1, the period of the reciprocation in each case is the same. This period is established by the speed of rotation of the cam 146, one revolution of the cam producing one completely cycle of motion of the end of the output member 116 regardless of the length of stroke. The linear speed of the reciprocating element, however, will be greater during the longer stroke than during the shorter stroke, as will be apparent. The constant period feature of the invention enables a variation to be made at a particular point in a complicated machine operation without requiring timing changes in other portions of the machine.

Figure 3:
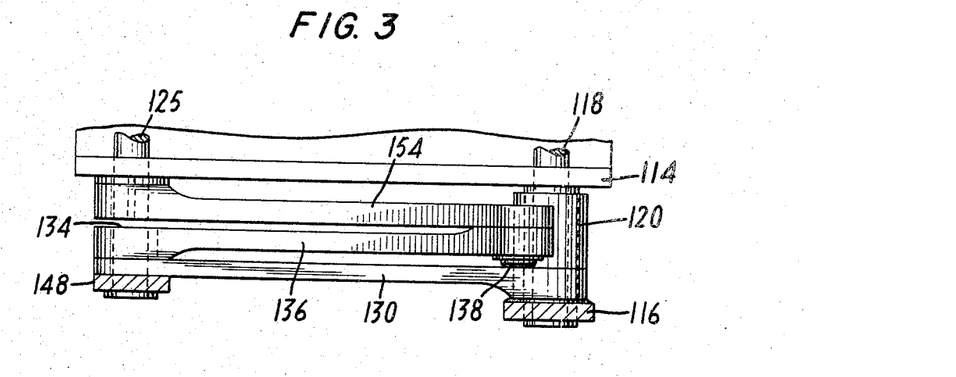
FIGURE 3 is a partial plan view of the invention taken along the line 3—3 of FIGURE 1.
Figures 4, 6:
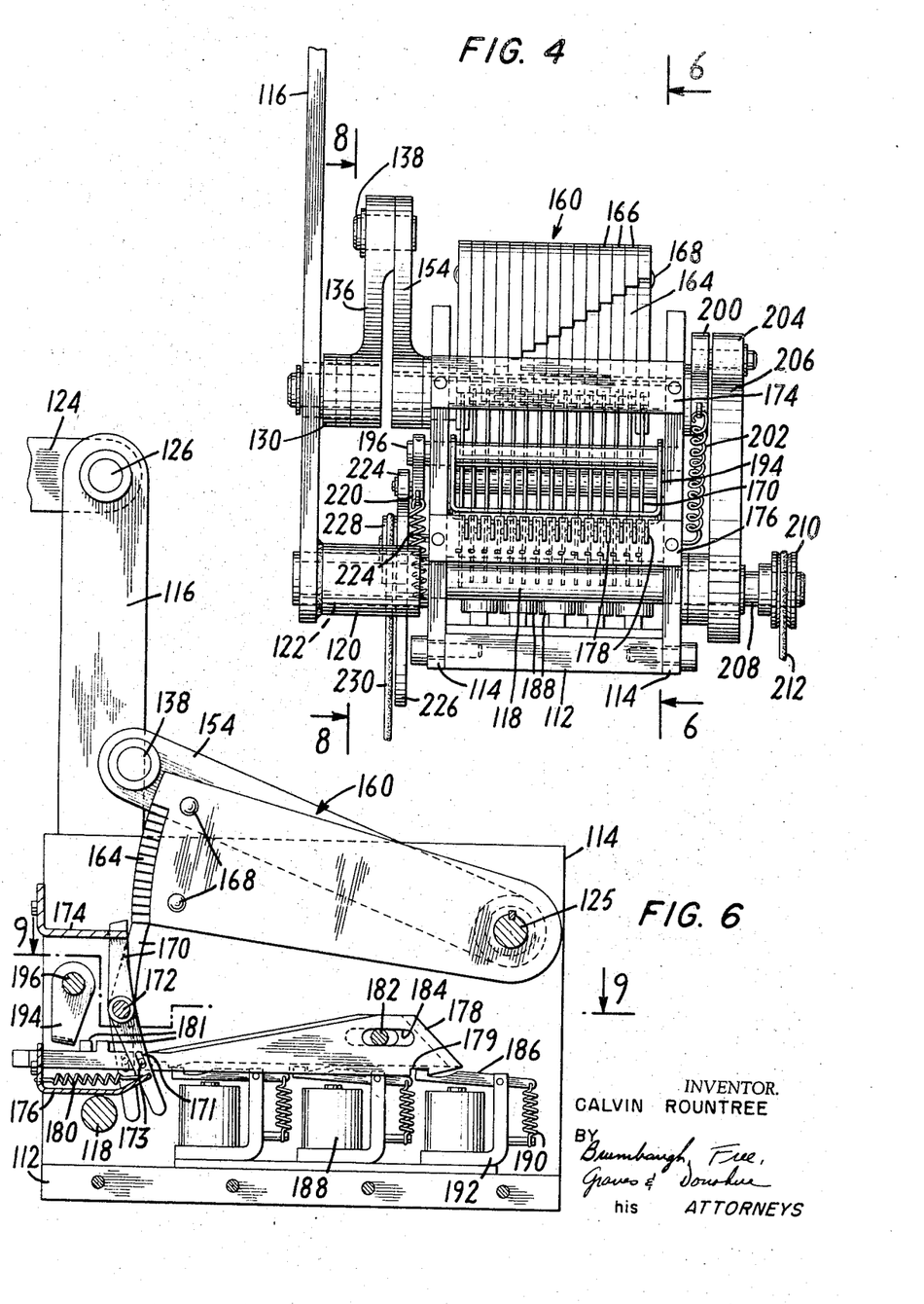
FIGURE 4 is a front elevation of the apparatus of the invention.
FIGURE 6 is a partial section through the apparatus taken along the line 6—6 of FIGURE 4.
Figure 8:
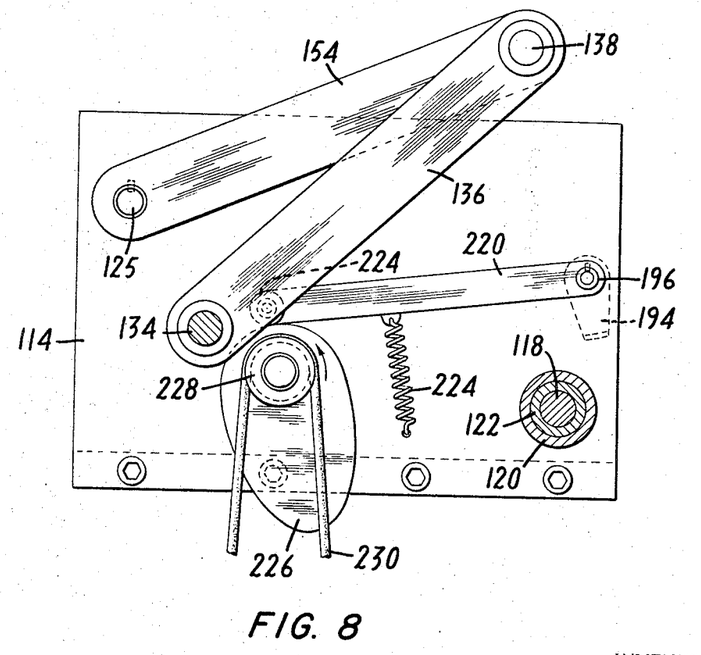
FIGURE 8 is a partial section through the apparatus taken along the line 8—8 of FIGURE 4.

As indicated above, the amplitude of the stroke of the mechanism may be varied by changing the position of the pivot point 138 on the radius arm 136. The arrangement of the invention for automatically changing the position of the radius arm is shown in FIGURES 3 through 9. Turning principally to FIGURES 3, 4 and 8, one end of a positioning lever 154 is pivotally coupled to the pivot point 138 of the radius arm 136. The other end of the lever 154 is keyed or otherwise fixed to a shaft 125 extending completely across the support frame 10 and journalled in the respective side walls 114 by any suitable bearing means. Thus, as the shaft 125 is rotated, the positioning lever 154 will rotate in a plane perpendicular to the axis of the shaft and move its common connection with the radius arm 136 along an arc of a circle whose center is the axis of the shaft 125.

The selector mechanism for controlling the positioning lever 154 and thus the radius arm 136 includes a control arm indicated generally at 160 (FIGURES 4 through 7) which is keyed or otherwise fixed to the shaft 125 for rotation therewith. In the arm itself is shown separately in FIGURE 7 and is seen to comprise a pair of side plates 162 spaced apart and provided with bores at one end for receiving the shaft 125. Suitable key and key way arrangements are provided in the shaft 125 and the ends of the side plates 162 so that movement of the arm 160 about the axis of the shaft 125 will similarly rotate the shaft. Other means, such as splines, may of course be used to fix the plates 162 to the shaft.

Between the ends of the side plates 162 remote from the shaft 125, a stepped cam surface 164 is provided by a plurality of laminations 166 fastened together and to the side plates by means of rivets or other suitable means 168. The cam surface 164 is generated by cutting a step in the forward face of each of the laminations 166 with successive steps being of a different depth. This is best shown in FIGURE 4.

The angular position of the control arm 160 with respect to the shaft 125 is established by selecting one of a group of interposer bars 170, corresponding in number to the number of steps on the cam surface 164 (15 in the embodiment shown), and drawing the selected interposer bar into position such that the corresponding step on the cam surface engages its upper end. This is shown in FIGURE 6. The angular position of the arm 160 and thus the positioning lever 154 and the radius arm 136 are thereby fixed to provide a given stroke at the upper end of the output member 116.

As seen best in FIGURE 6, the interposer bars 170 are all pivoted on a common shaft 172 extending transversely between the sides 114 of the support frame. Upper and lower comblike guide members 174 and 176 respectively maintain the interposer bars in proper vertical alignment.

A short longitudinal slot 171 is provided in each of the interposer bars below the shaft 172 for engaging a pin 173 fastened on the forward end of a horizontally disposed slide bar 178. Each of the interposer bars 170 is thus coupled to an individual slide bar 178 and, as can be seen from FIGURE 6, the horizontal position of the slide bar 178 will determine whether the upper end of its respective interposer bar 170 is in or out of engagement with its associated step on the cam surface 164.

At a point below the slot 171, each of the interposer bars 170 is connected to the forward end of the lower guide member 176 by a tension spring 180. The spring urges the lower end of the interposer bar towards the front of the guide member 176 and thus tends to maintain the slide bar 178 in its left-hand or extended position. The slide bar 178 is constrained to move along a horizontal path by the pin and slot coupling to the interposer bar and the pin 182 and horizontal slot 183 adjacent its right-hand end. It will be understood that a corresponding slide bar 178 will be associated with each of the interposer bars 170.

All of the slide bars 178 are normally retained in their retracted or right-hand positions against the pull of the spring 180 by means of relay armatures 186 which include ear portions at one end thereof for engagement with detents 179 provided in the lower edges of the respective slide bar members 178. An armature 186 along with an associated actuating relay coil 188 is provided for each of the slide bars 178. The armatures 186 are pivoted about the upper end of an L-shaped support bar 192 which also holds the relay coil 188. A spring 190 coupled between the end of the armature and the member 192 normally maintains the ear at the end of the armature in its elevated position for engagement with the detent 179 on the associated slide bar 178. When electrical current is applied to the coil 188 via conductors (not shown) the relay is energized and the armature 186 lowered, thereby releasing the slide bar 178 and allowing it to assume its lefthand or extended position.

Figure 9:
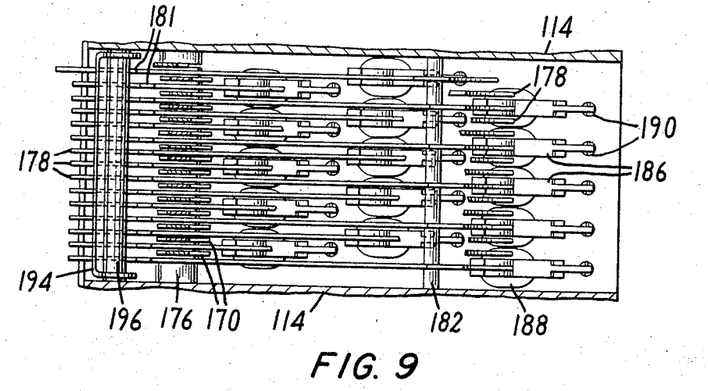
FIGURE 9 s ia partial section of the apparatus taken along the line 9—9 of FIGURE 6.

As seen in FIGURE 9, the individual relay coils 188 with their associated armatures 186 are disposed in staggered rows on the base plate 112 of the support frame to permit, in this case, 15 slide bars and interposer bars to be actuated. All of the slide bars 178 are identical except for the positioning of the detent 179 along the bottom edge. In those slide bars associated with the relays mounted closest to the interposer bars, the detent is correspondingly forward of the pin 182. As will be discussed in detail hereinafter, only one of the relay coils 188 is energized at any one time and thus only one of the slide bars 178 is released to actuate its interposer bar. Therefore, no holding power is required for the unused relays and the selected relay will require power only for sufficient time to allow the detent 179 in the slide bar to move beyond the ear on the respective armature 186.

Each of the slide bars 178 is provided with an upstanding ear 181 along its upper edge for engagement by a bail 194 which is mounted on a laterally extending shaft 196 and rotated through a limited angle by means to be described hereinafter. The bail 194 and the ears 181 serve to restore the previously extended slide bar 178 to its retracted position when a change in stroke amplitude is being made.

Figure 5:
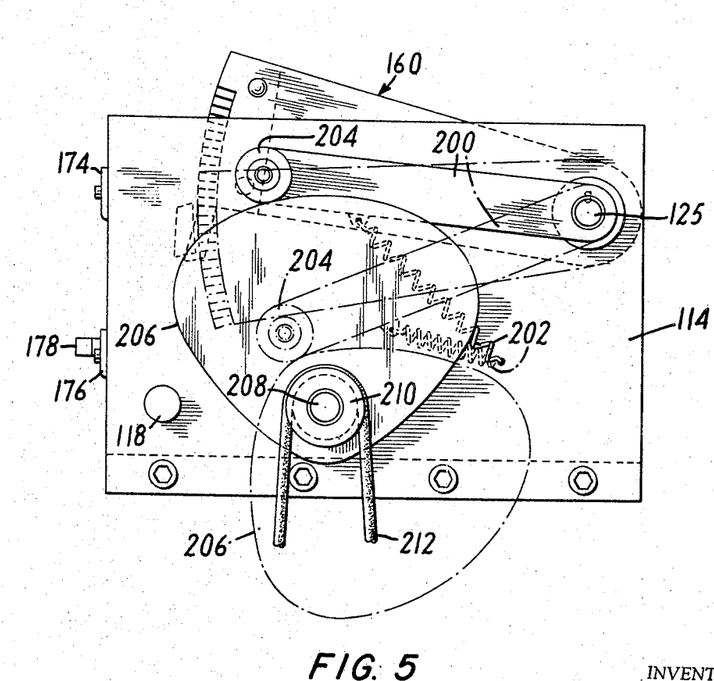
FIGURE 5 is a side elevation of the invention showing the side of the structure opposite to that shown in FIGURES 1 and 2.
Figure 7:
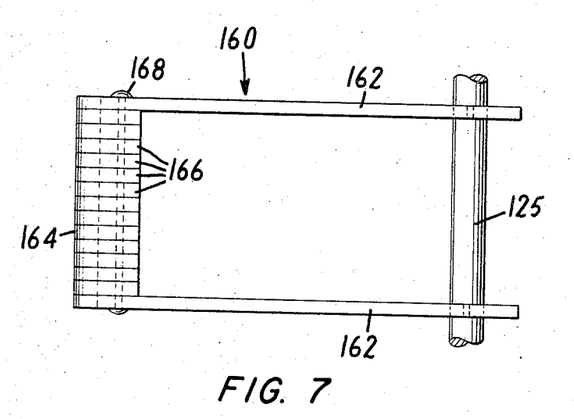
FIGURE 7 is a plan view of a portion of the apparatus showing its structural details.

Turning now to FIGURES 4 and 5, a release arm 200 is keyed or otherwise fixed to the shaft 125 outside of and on the opposite side of the frame 110 from the positioning lever 154. The arm 200 is biased, such as by spring 202, to remain in its lowermost position. Since it is fixed to the shaft 125, its rotation will simultaneously rotate the control arm 160, the positioning lever 154 and the radius arm 136.

At the end of the arm 200 opposite its coupling to the shaft 125 is mounted a cam follower roller 204. The roller 204 is engaged by the peripheral surface of a cam 206 which is mounted on a shaft 208 journaled in the associated side plate 114 of the support frame. On the same shaft is mounted a pulley 210 driven by a belt 212. The belt is driven from any suitable source of rotational power which is operative upon command to cause a single revolution of the pulley 210, and thus of the cam 206.

The shape of the cam 206 is selected such that a substantial dwell occurs at its point of major throw, as illustrated in solid line in FIGURE 5. The major throw is selected such that the arm 200 will be rotated about the shaft 125 to an extent that the control arm 160 is raised to a height where the lowermost step on its cam surface 164 is beyond possible engagement with the associated interposer bar. During this portion of the single revolution of the cam 206, the previously actuated interposer bar will be returned to its home position and a new interposer bar selected to engage its associated cam step when the control arm is subsequently lowered.

At the lowermost point of the arm 200, i.e., when the cam 206 presents its shortest throw as indicated in dotdash lines in FIGURE 5, the control arm 160 is lowered to an extent that its shortest step can be engaged by its respective interposer bar. It will be understood that in the operating position of the control arm 160, the surface of the cam 206 will actually be out of contact with the roller 204. When any of the intermediate steps are selected, the arm 160 will engage the selected interposer bar before the cam 206 has completed its revolution.

FIGURES 4 and 8 show the means for actuating the bail 194 to return the previously selected slide bar 178, and thus the corresponding interposer bar 170 to their non-selected positions prior to the making of a new stroke selection. This structure is not shown in FIGURES 1 and 2 so as not to complicate those figures and interfere with the understanding of the lever system.

A rocking lever 220 is keyed or otherwise fixed to the shaft 196 journaled in the side plates 114 and normally biased by spring 222 to a position in which the bail 194 is swung away from the ears 181 on the slide bars. At the other end of the lever 220 there is provided a cam follower roller 224 which engages the peripheral surface of a cam 226. The latter is rotated by means of a pulley 228 mounted on a common shaft therewith and driven by a belt 230. The drive for the belt 230 may be taken from the same source as that provided for rotating the cam 206 (FIGURE 5) and will produce a single rotation of the cam 226 in synchronism with the rotation of the cam 206.

The cam 226 is so shaped that the lever 220 will be raised to its maximum angular displacement at a point during the rotation of the cam 206 (FIGURE 5) when the arm 160 is raised to its uppermost position. Consequently, the bail 194 will return the previously selected slide bar 178 to its retracted position, releasing the interposer bar to its non-selected position. Since the cam 226 is considerably smaller than the cam 206, the return stroke of the bail will be completed before much of the dwell portion provided by the cam 206 is over.

The drawings, particularly FIGURE 6, show the selector arm 160 in its uppermost selective position, i.e., with its longest cam step engaged by the interposer bar 170. This raises the positioning lever 154 and thus the radius arm 136 to its highest position as seen in FIGURE 1, resulting in the greatest stroke amplitude. As long as the cam 146 (FIGURES 1 and 2) rotates, the reciprocation of the element 124 will remain at this amplitude.

When it is desired to change the stroke amplitude, the single revolution drive means for the cams 206 and 226 is actuated, preferably at the end of a given stroke of the output member 116. The single revolution drive means is operable to complete its single revolution in a short period of time compared to the period of the reciprocation so that the complete revolution is over prior to the initiation of the succeeding stroke.

As the cams 206 and 226 begin their single revolutions, the control arm 160 is first raised by the release arm 200 above the upper end of the previously selected interposer bar 170 and then held there for a short dwell period. At the very beginning of the dwell period, the cam 226 rotates the rocking lever 220 to actuate the bail 194 and return the previously selected slide bar 178 to its retracted position. At this time, none of the relay coils 188 are actuated. During the remainder of the dwell period of cam 206, the relay coil 188 corresponding to the selected step on the cam face 164 which will give the prescribed new stroke is energized, pulling its associated armature 186 out of engagement with the slide bar 178. The latter is now free to move to its extended position to bring its associated interposer bar into position for engagement with the mating step on the cam surface 164. At the end of dwell period, the release arm 200 is lowered to drop the control arm 160. However, the downward motion of the latter is limited by engagement with the selected interposer bar and the control arm is held firmly in that position under the bias of the spring 202. The single revolutions of the cams 206 and 226 are now completed.

By this time, the succeeding stroke of the output member 116 has commenced but, since the position of the fixed end of the radius arm 136 has been changed, its stroke will correspondingly differ in length. Since in the example given the radius arm 136 has been lowered, the stroke would be shortened, such as seen by comparing FIGURES 1 and 2.

The rotation of the cam 146 (FIGURE 1) continues meanwhile and the reciproctaion will proceed at the new amplitude until such time as a new stroke length is selected.

Figure 10:
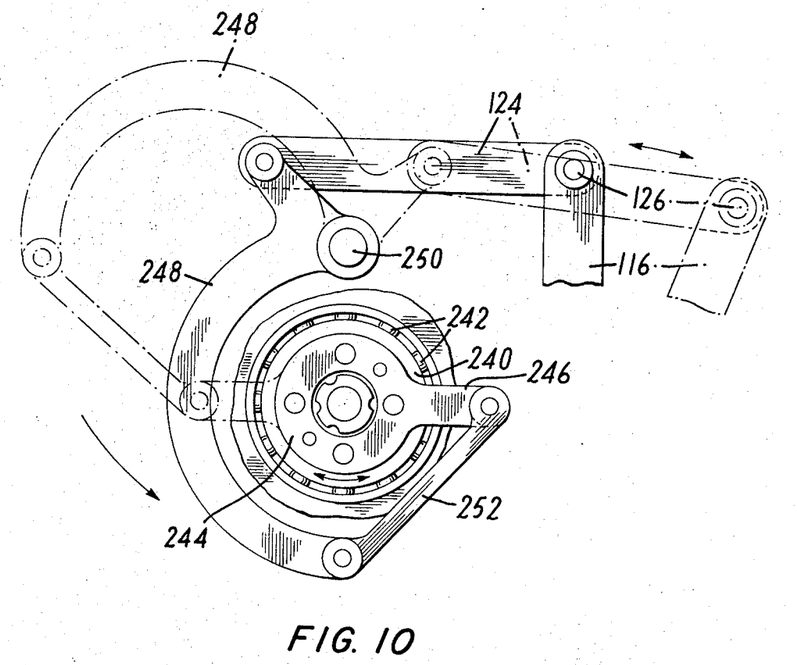
FIGURE 10 illustrates an additional linkage for converting the reciprocating motion provided by the apparatus into oscillating rotary motion.

FIGURE 10 illustrates how the apparatus of the present invention may be employed to produce an oscillating rotary motion, the angle of rotation of which may be varied as described above. In the drawing, the numeral 240 indicates the end of a cylindrical element that is to be rotated about its axis. The number 240 is journaled in the device in which it is used by means of any suitable bearing, such as the ball bearing 242 illustrated. A plate 244 having an integral radial extension 246 is bolted or otherwise fastened to the end of the member 240. The linkage from the output member 116 includes the reciprocating element 124 which rocks an arcuate link 248 about a fixed pivot 250. The other end of the link 248 is connected by a member 252 to the end of the extension 246. All of these connections are freely pivotal.

As can be seen by comparison of the solid line and dot-dash line positions of the members in FIGURE 10, the reciprocating motion of the element 124 rocks the link 248 about its pivot 250 and thus induces an angular movement of the extension 246 which in turn serves to rotate the member 240 about its axis. With the linkage shown, the maximum reciprocating stroke of the element 124 will produce a 180° rotation of the member 240. If the stroke is decreased, such as by changing the selector mechanism as described above, the angle of rotation of the member 240 will correspondingly be decreased. It will also be appreciated that the frequency of oscillation of the rotary motion imparted to the member 240 will be the same as that of the reciprocating element 124. Similarly, the period of the oscillating rotary motion will remain constant and equal to the rotational speed of the driving cam 146 (FIGURE 1).

From the foregoing, it will be seen that the present invention provides a reliable, readily adjustable mechanism for producing a reciprocating motion of a selectively variable stroke length, capable of use in many varied environments. Not only is the device variable in stroke, but the mechanism for changing the stroke length is such that a change can be effected without interrupting even a single cycle of reciprocation. Thus, no stoppage of the machine in which the movement is employed is required to change the stroke length.

Since selection of the stroke length is effected by eletrically responsive means, the arrangement is particularly adaptable for use with automated systems controlled by computers, whereby selection of the stroke length is accomplished by routing of suitable electrical signals from the computer to the relay arrangement. Moreover, the rapidity with which stroke changes can be made lends itself to rapid automatic machine processes. The constant period characteristic of the reciprocating motion provided by the device also is of advantage in automated processing where machine cycles are maintained substantially uniform even though changes in size are made.

In the drawings, the output member 116 has been shown pivoted at one end to the frame and coupled at the other end to the element to be reciprocated, with the connecting link 130 pivoted thereto at a point intermediate the two ends. This however is but one possible arrangement of the output member. For example, a substantial portion of the output member may extend below the support frame, whereby the connecting link 130 is pivoted to it at its upper end and the reciprocating element is coupled to it at its lower end. All that is required to produce the reciprocating motion at one point of the member 116 is that the point of connection of the connecting link thereto be longitudinally spaced from the pivot point of the output member 116 on the frame 110 and the point on the member 116 connected to the element to be reciprocated. Also, although a simple straight output member 116 has been shown, it will be realized that the member may be curved or otherwise shaped to suit any particular application.

It will be understood that the stroke length control may be actuated at different points of a cycle by varying the shape and movement of the cam 206. For example, instead of giving it a single revolution upon command, it can be driven continuously and the stroke length change effected at some point along the stroke, thereby enabling the length of each reciprocating stroke to be individually set. Cam 226 would, of course, be rotated at a suitable, related speed. The speed of continuous rotation of the cam 206 may be less than, equal to, or greater than the speed of the reciprocating member, depending on the degree of flexibility of stroke length control desired. If the cam speed is greater than the reciprocating speed, variations in fractions of strokes will be permitted.

Furthermore, although a particular embodiment of apparatus for selecting the stroke length is shown, other arrangements for this same purpose may also be used. For example, other devices such as air or hydraulic cylinders, mechanically actuated cam mechanisms, etc., may be adapted to effect the selection function. Alternatively, the cam surface 164 on the control arm 160 may be smoothly varying, rather than stepped, and positioned via a threaded coupling to allow infinitely adjustable stroke length. The interaction of the reciprocating lever system and stroke adjusting mechanisms encompassed by the invention provide for a virtually unlimited choice of stroke controls, all of which may be effected during any portion of a given cycle without requiring shutting down of the machine.

Many other modifications of the apparatus of the invention illustrated will occur to those skilled in the art and it is intended that the invention be limited only by the scope of the appended claims.

I claim:

1. A mechanism for producing periodic reciprocating movement comprising, an elongated output member having a first point thereon rotatably coupled to a fixed pivot, means at a second point on said output member longitudinally spaced from said first point for coupling to an element to be reciprocated, a connecting link having one end pivotally connected to said output member at a point longitudinally spaced from both said first and second points, a radius arm having one end pivotally connected to the other end of said connecting link, the other end of said radius arm being pivoted at a predetermined position, and means to couple the commonly pivoted ends of said connecting link and said radius arm to a source of motive power for oscillation of said commonly pivoted ends along an arcuate path whose center is at the said other end of said radius arm.

2. A mechanism for producing periodic reciprocating movement of selectable amplitudes comprising, an elongated output member having a first point thereon rotatably coupled to a fixed pivot, means at a second point on said output member longitudinally spaced from said first point for coupling to an element to be reciprocated, a connecting link having one end pivotally connected to said output member at a point longitudinally spaced from both said first and second points, a radius arm having one end pivotally connected to the other end of said connecting link, means pivoting the other end of said radius arm at any one of a plurality of selectable positions, and means to couple the commonly pivoted ends of said connecting link and said radius arm the said other to a source of motive power for oscillation of said commonly pivoted ends along an arcuate path whose center is at the said other end of said radius arm.

3. A mechanism for producing periodic reciprocating movement for selectable amplitudes comprising, an elongated output member having a first point thereon rotatably coupled to a fixed pivot, means at a second point on said output member longitudinally spaced from said first point for coupling to an element to be reciprocated, a connecting link having one end pivotally connected to said output member at a point longitudinally spaced from both said first and second points, a radius arm having one end pivotally connected to the other end of said connecting link, adjustable means pivoting the other end of said radius arm at any one of a plurality of selectable positions, and means including a rotating member for oscillating the commonly pivoted ends of said connecting link and said radius arm along an arcuate path whose center is at the said other end of said radius arm, whereby a change in the position of said other end of said radius arm produces a change in the amplitude of the reciprocating movement induced in said element.

4. A mechanism for producing periodic reciprocating movement of selectable amplitude comprising, a support frame, an elongated output member having a first point thereon rotatably coupled to a fixed pivot on said frame, means at a second point on said output member longitudinally spaced from said first point for coupling to an element to be reciprocated, a connecting link having one end pivotally connected to said output member at a point longitudinally spaced from both said first and second points, a radius arm having one end pivotally connected to the other end of said connecting link, a positioning lever pivoted at one end on said frame and pivotally connected at its other end to the other end of said radius arm, means on said frame to selectively rotate said positioning lever predetermined angular distances about its said one end, thereby to selectively change the position of said other end of said radius arm, and means to couple the commonly pivoted ends of said connecting link and said radius arm to a source of motive power fo oscillation of said commonly pivoted ends along an arcuate path whose center is at the said other end of said radius arm.

5. A mechanism for producing periodic reciprocating movement of selectable amplitudes comprising, a support frame, an elongated output member having a first point thereon rotatably coupled to a fixed pivot on said frame, means at a second point on said output member longitudinally spaced from said first point for coupling to an element to be reciprocated, a connecting link having one end pivotally connected to said output member at a point longitudinally spaced from both said first and second points, a radius arm having one end pivotally connected to the other end of said connecting link, a shaft journaled in said frame, a positioning lever having one end fixed to said shaft for rotation therewith and its other end pivotally connected to the other end of said radius arm, a control arm having one end fixed to said shaft for rotation therewith, means for rotating said control arm about the axis of said shaft to any one of a plurality of predetermined angular positions, thereby to correspondingly rotate said shaft and said positioning lever and thus determine the position of said other end of said radius arm, and means to couple the commonly pivoted ends of said connecting link and said radius arm to a source of motive power for oscillation of said commonly pivoted ends along an arcuate path whose center is at the said other end of said radius arm.

6. A mechanism for producing periodic reciprocating movement of selectable amplitudes comprising, a support frame, an elongated output member having a first point thereon rotatably coupled to a fixed pivot on said frame, means at a second point on said output member longitudinally spaced from said first point for coupling to an element to be reciprocated, a connecting link having one end pivotally connected to said output member at a point longitudinally spaced from both said first and second points, a radius arm having one end pivotally connected to the other end of said connecting link, a shaft journaled in said frame, a positioning lever having one end fixed to said shaft for rotation therewith and its other end pivotally connected to the other end of said radius arm, a control arm having one end fixed to said shaft for rotation therewith, a stepped cam surface on said control arm radially spaced from the axis of said shaft, a plurality of movable elements supported from said frame, one for each step on said cam surface, selectable means for moving a desired one of said movable elements into engagement with its corresponding step on said cam surface to rotate said shaft to a predetermined angular position, thereby to correspondingly rotate said positioning lever and thus determine the position of said other end of said radius arm, and means to couple the commonly pivoted ends of said connecting link and said radius arm to a source of motive power for oscillation of said commonly pivoted ends along an arcuate path whose center is at said other end of said radius arm.

7. A mechanism according to claim 6 wherein said selectable means comprises a normally unenergized electrical relay for each of said moving elements, energization of a particular relay being effective to move its associated movable element into cam-engaging position.

8. A mechanism according to claim 6 wherein said selectable means comprises a normally unenergized electrical relay for each of said moving elements, an armature for each of said relays including an ear portion extending therefrom, a slidable element coupled to each of said movable elements and spring biased to urge its associated movable element into cam-engaging position, and a detent on each of said slidable elements for engaging the ear portion on the armature of its associated relay, whereby said slidable elements are restrained against the spring bias when said relays are unenergized and released when said relays are energized.

9. A mechanism according to claim 8 further including means operable prior to said selectable means for returning a previously released slidable element to its restrained position wherein its detent is engaged by the ear portion on the armature of its associated relay, thereby releasing the corresponding movable element from its cam-engaging position.

10. A mechanism for producing periodic reciprocating movement of selectable amplitudes comprising, an elongated output member having a first point thereon rotatably coupled to a fixed pivot, means at a second point on said output member longitudinally spaced from said first point for coupling to an element to be reciprocated, a connecting link having one end pivotally connected to said output member at a point longitudinally spaced from both said first and second points, a radius arm having one end pivotally connected to the other end of said connecting link, adjustable means pivoting the other end of said radius arm at any one of a plurality of selectable positions, means including a rotating member for oscillating the commonly pivoted ends of said conecting link and said radius arm along an arcuate path whose center is at the said other end of said radius arm, and means operable within a portion of a period of said reciprocating movement for actuating said adjustable means to move said other end of said radius arm from one to another of said selectable positions, whereby a change in amplitude of the reciprocating movement may be effected substantially without interruption.

11. A mechanism for producing periodic reciprocating movement of selectable amplitudes comprising, a support frame, an elongated output member having a first point thereon rotatably coupled to a fixed point on said frame, means at a second point on said output member longitudinally spaced from said first point for coupling to an element to be reciprocated, a connecting link having one end pivotally connected to said output member at a point longitudinally spaced from said first and second points, a radius arm having one end pivotally connected to the other end of said connecting link, a shaft journaled in said frame, a positioning lever having one end fixed to said shaft for rotation therewith and its other end pivotally connected to the other end of said radius arm, a control arm having one end fixed to said shaft for rotation therewith, a stepped cam surface on said control arm radially spaced from the axis of said shaft, a plurality of movable elements supported from said frame, one for each step on said cam surface, selectable means for moving a desired one of said movable elements into engagement with its corresponding step on said cam surface to rotate said shaft to a predetermined angular position, thereby to correspondingly rotate said positioning lever and thus determine the position of said other end of said radius arm, means operable prior to actuation of said selectable means to move said cam surface on said control arm out of engagement with any of said movable elements and return any of said movable elements into their non-selected position, and means to couple the commonly pivoted ends of said connecting link and said radius arm to a source of motive power for oscillation of said commonly pivoted ends along an arcuate path whose center is at said other end of said radius arm.

12. A mechanism according to claim 11 in which said means to move said cam surface out of engagement with said movable elements comprises a release arm fixed at one end to said shaft to rotate therewith, and means to rotate said release arm and thus said shaft a predetermined angular distance sufficient to move said cam surface out of engagement with said movable elements and then return said cam surface to a position of engagement with a subsequently selected one of said movable elements.

13. A mechanism according to claim 12 wherein said means to rotate said release arm includes a cam and drive means operable to rotate said cam a single revolution during a small portion of the period of said reciprocating movement.

No references cited.

FRED C. MATTERN, Jr., *Primary Examiner.*

C. J. HUSAR, *Assistant Examiner.*